Patented Mar. 7, 1933

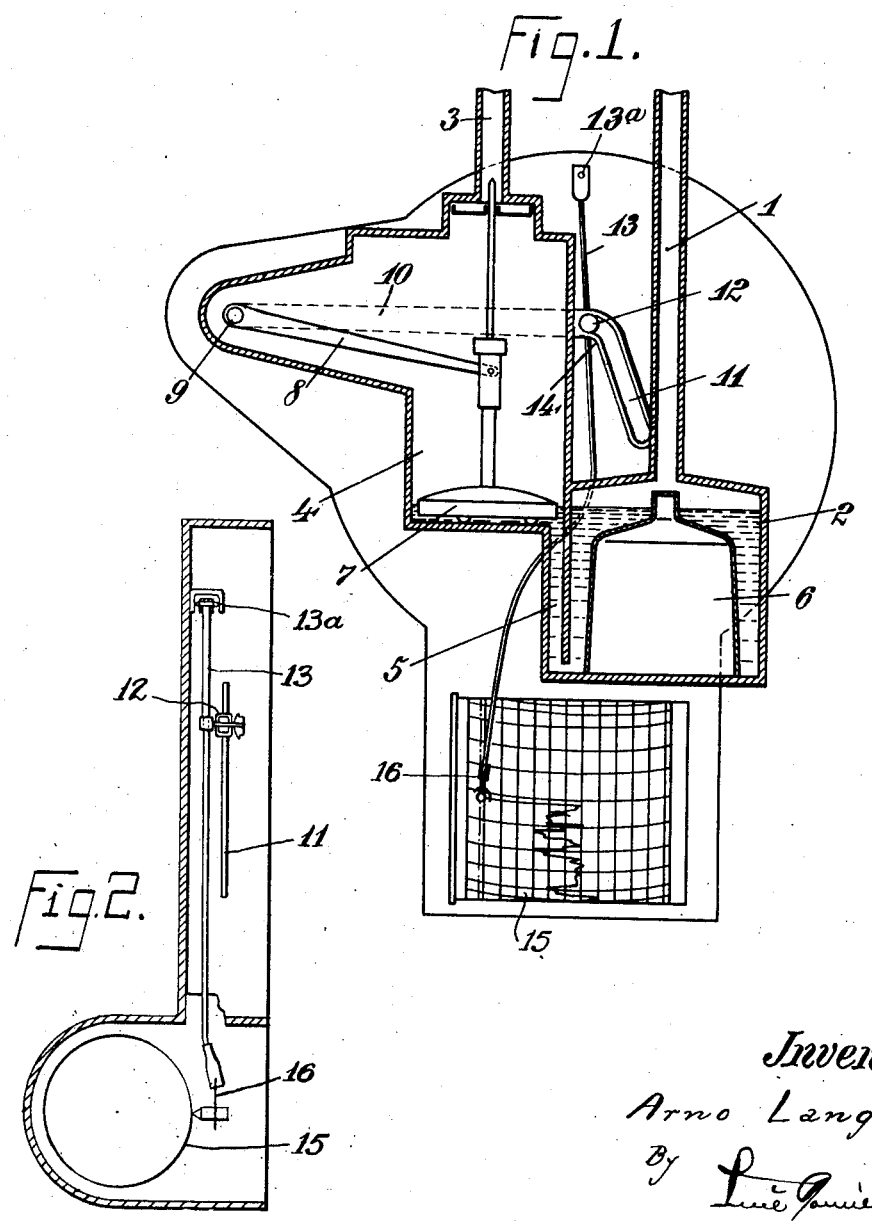

1,900,823

UNITED STATES PATENT OFFICE

ARNO LANG, OF TREUENBRITZEN, GERMANY, ASSIGNOR TO THE FIRM DR. MARTIN BÖHME, OF BERLIN, GERMANY

DIFFERENTIAL PRESSURE GAUGE FOR MEASURING FLOW OF FLUIDS IN CONDUITS

Application filed April 12, 1927, Serial No. 183,185, and in Germany May 6, 1926.

This invention relates to registering and indicating pressure gauges with differential manometers, in which the movements of a mercury column are transmitted to the indicator and to the recording instrument by a float. Since the flow quantities to be measured are proportional to the square roots of the differential pressures, the deflections of the pointer and of the recorder stylus, with direct transmission, stand in quadratic relation to the flow quantities. The scale graduations of the indicator are, therefore, very close in the lower range of measurements and are difficult to read, while in the upper range, the scale is unnecessarily wide. The recording movements of the stylus are not in linear proportion to the amounts of flow and therefore cannot be integrated correctly by a planimeter, so that such computation of the diagram is not possible. The conversion to linear proportions can be attained, according to known rules, either by a cam mechanism or by suitably forming one leg of the mercury differential manometer. But at the same time, such conversion can be attained for the indicator and recorder only when the movements of the float, from which those of the indicator and recorder are derived, are in linear proportion to the pressure differences. This requirement is fulfilled, for example, when one leg of the mercury tube contains a parabolic body, of such dimensions as to vary the level proportionally to the square root, or else when such leg is correspondingly shaped. But this arrangement has the great disadvantage that it does not permit of a conversion to linear proportionality at the lower pressure differences, because, for the zero line, the surface of the mercury in the vessel, containing the inserted body, would have to be infinitely great (see the statements in German Patent No. 380,213). In this range of measurements, a cam is the only conversion means which can be used.

In the present invention, the cam is combined with a vessel containing an insert body. The cam takes care of the conversion to linear proportionality in the lower range of the measurements and the insert vessel in the upper range. There are thus obtained linear deflections of the recorder up to near the zero line and, at the same time also, linear deflections of the indicator from the point at which the insert vessel comes into action. Below this point, the deflections of the indicator are no longer linear. But that is immaterial, since in the lowest range of flow, a measurement is not usually required. But it is very important for the recorder that its deflections should be linear as closely as possible to the zero line, because the diagrams must be calculated and can be planimetered correctly, that is, traversed by the tracer of a planimeter in order to determine their areas, only when the linear ratio exists throughout the entire range.

A form of this instrument is shown in Figure 1 in the drawing in section, and Fig. 2 is a sectional view showing the recording lever and the cam.

The pressure of the flowing medium on the forward side, that is, the side first encountered by the medium in its flow, of the orifice disc (not shown) is transmitted through a pipe 1 to a vessel 2, while the pressure behind said disc is transmitted through a pipe 3 to a vessel 4. The two vessels are in communication through a passage 5. Vessel 2 contains the insert body 6, which converts the differences of the liquid levels, which are in quadratic relation to the amount of the flow, into movements of the liquid level in vessel 4, which are in linear ratio to the flow. The insert body 6 is shaped substantially as a paraboloid of revolution produced by revolving a parabola about its axis, the vertex of the paraboloid being directed upwardly and the axis being vertical. An insert of this shape will act to accomplish what might be termed "extracting the square root," that is, providing first degree proportionality in place of the quadratic relationship which would otherwise exist. This root extracting effect, however, cannot be attained in the lower range of measurement near the zero line, because then theoretically the mercury surface at the vertex of the parabola would have to be of infinite area. This phenomenon however, is taken into account by means of the cam 11 described hereinafter, which at flows below a certain minimum will assume the function of providing the linear relation formerly accomplished by the insert body. Vessel 4 contains the float 7, the movements of which are transmitted by a link 8 to a shaft 9 to which said link is fixed, on which is fixed also the lever 10 carrying the cam 11, in which a roller 12 of the recording lever 13 is guided. The cam 11 is loop-shaped as shown and surrounds the roller 12, so that the roller will slide in the cam as said cam is moved up and down. Shaft 9 thus actuates, by means of said roller and slot, an indicator or recording stylus 16, which plays over a graduated sheet 15. The recording lever 13 is pivoted at 13a as shown in Figure 2. Obviously if desired an indicator may also be actuated directly from the shaft 9 or through the usual gear segment and gear generally used in measuring instruments, for example as shown in British Patent 248,768. In this case the indicator would also partake of a movement proportional to that of shaft 9, which would be proportional to the flow throughout the main range of measurement. This construction is so obvious that it needs no further illustration than the above reference to the British patent.

At low differential pressures, up to about 100 mm., the insert vessel causes no conversion of the movement of the liquid from the quadratic to the linear ratio, because the movements of the float are too small owing to the above mentioned conditions. This effect is taken care of at this time by the first portion of the cam 11, which increases the deflection of the recording lever. While it might be possible to determine the correct shape of this portion of the cam 11 by purely mathematical methods it is generally preferred in practice to shape said cam empirically, that is, by experiment. It may be done by accurately measuring the difference in mercury levels in the two chambers, for any given small flow and computing the corresponding flow, from the well known formula $$v = c\sqrt{p^1 - p^2},$$

and then shaping the cam so that for such flow the indicator and recorder will assume the proper positions on their scales on the basis of linear proportionality. Several points may be thus determined and connected by a smooth curve with sufficient accuracy for most purposes. In the above formula $p^1$ and $p^2$ represent the pressures on the respective sides of the orifice disc, $v$ is the velocity of flow, and $c$ is a constant depending upon the dimensions of the particular apparatus. In this way the variations of the mercury column can be converted into linear ratio down to a differential pressure of 15 mm. water column. Point 14 of cam 11 corresponds to the critical point of about 100 mm. water column. Since the conversion into linear proportion of a differential pressure of 100 mm. water column and over, is effected by the insert body alone, the cam 11, from the point 14 downwardly, becomes merely a guide for the roller 12, without itself acting as a square root extractor.

The indicator, from the point where the insert vessel becomes effective, likewise provides deflections linear with respect to the flow.

Thus by the combination of cam and insert vessel, linear deflections of the recorder lever can be obtained almost to the zero point and linear deflections of the indicator within the practically useful range of measurement.

What I claim is:—

1. A differential pressure gauge for measuring the flow of fluids, comprising a pair of intercommunicating vessels; a liquid partially filling said vessels; a float in one of said vessels and supported by said liquid; a cam; means for transmitting the movement of the float to the cam; a recording lever controlled and actuated by the cam; and a stationary insert body shaped as a paraboloid of revolution with its axis vertical and its vertex directed upwardly in the other vessel to modify the free sectional area of said vessel whereby to produce a modified relationship between the level of the liquid in the other vessel and the differential pressure producing the difference of elevations in the two vessels whereby the changing of level in the float-containing vessel becomes proportional to the square root of the pressure difference applied to the two vessels of the gauge, said cam varying the movement of the recording lever dependent upon the float at certain positions of the liquid with respect to the insert body.

2. A differential pressure gauge for measuring the flow of liquids comprising a pair of intercommunicating vessels; a liquid partially filling said vessels; a float in one of said vessels and supported by said liquid; a stationary part; a lever pivoted at one end to said stationary part of the gauge and connected at the other end to the float; a cam; means including a second lever connected to the cam for communicating the movements of the pivoted lever to the cam; a recording lever controlled and actuated by the cam; and a stationary insert body shaped as a paraboloid of revolution with its axis vertical and its vertex directed upwardly in the other vessel to modify the free sectional area of said vessel whereby to produce a modified relationship between the level of the liquid in the other vessel and the differential pressure producing the difference of elevations in the two vessels whereby the changing of level in the float-containing vessel becomes proportional to the square root of the pressure difference applied to the two vessels of the gauge, said cam varying the movement of the recording lever dependent upon the float at certain positions of the liquid with respect to the insert body.

3. A differential pressure gauge for measuring the flow of fluids, comprising a pair of intercommunicating vessels; a liquid partially filling said vessels; a float in one of said vessels and supported by said liquid; a cam; means for transmitting the movement of the float to the cam; a recording lever controlled and actuated by the cam; and a stationary insert body in the other of said vessels to modify the free sectional area of said vessel whereby to produce a modified relationship between the level of the liquid in the other vessel and the differential pressure producing the difference of elevations in the two vessels whereby the changing of level in the float-containing vessel becomes proportional to the square root of the pressure difference applied to the two vessels of the gauge, said cam varying the movement of the recording lever dependent upon the float at certain positions of the liquid with respect to the insert body.

In testimony whereof I hereunto affix my signature this 24th day of March, 1927.

ARNO LANG.